April 5, 1966 C. W. THOMAS 3,244,851
METHODS OF AND APPARATUS FOR MAKING TUBING
Filed Oct. 7, 1963 4 Sheets-Sheet 1
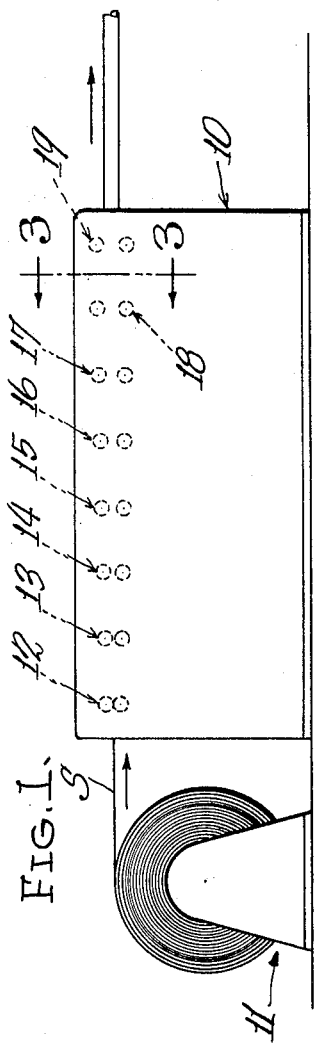
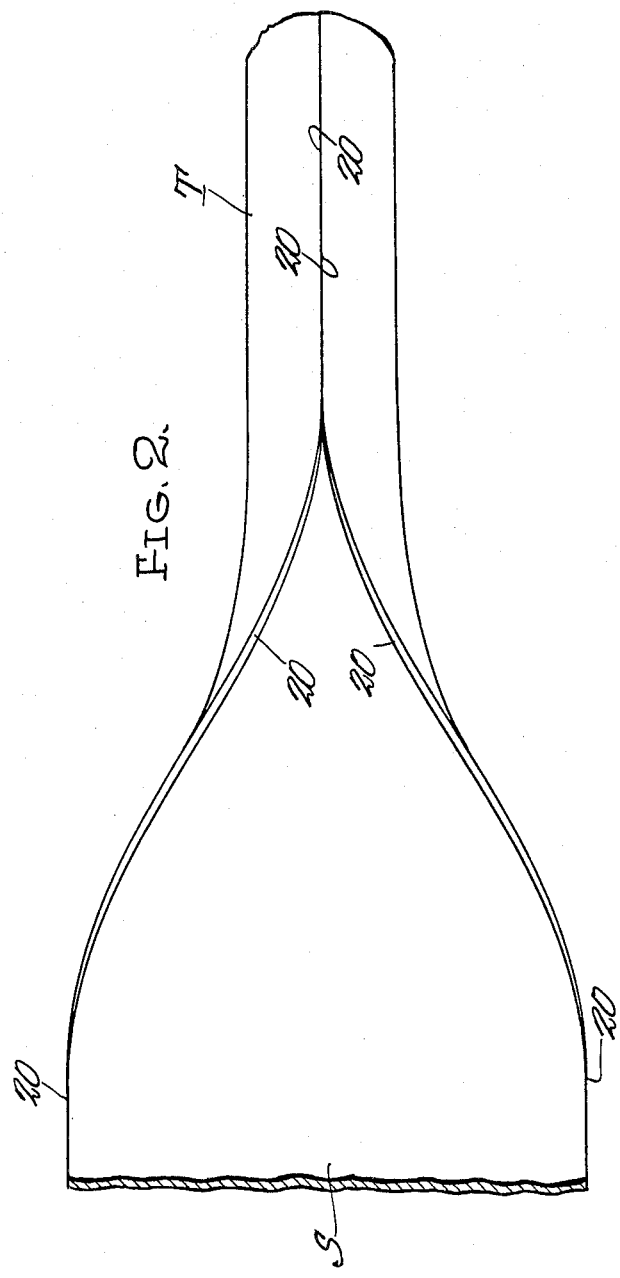
INVENTOR.
CHARLES W. THOMAS
BY
*Williams and Kreske*
ATTORNEYS

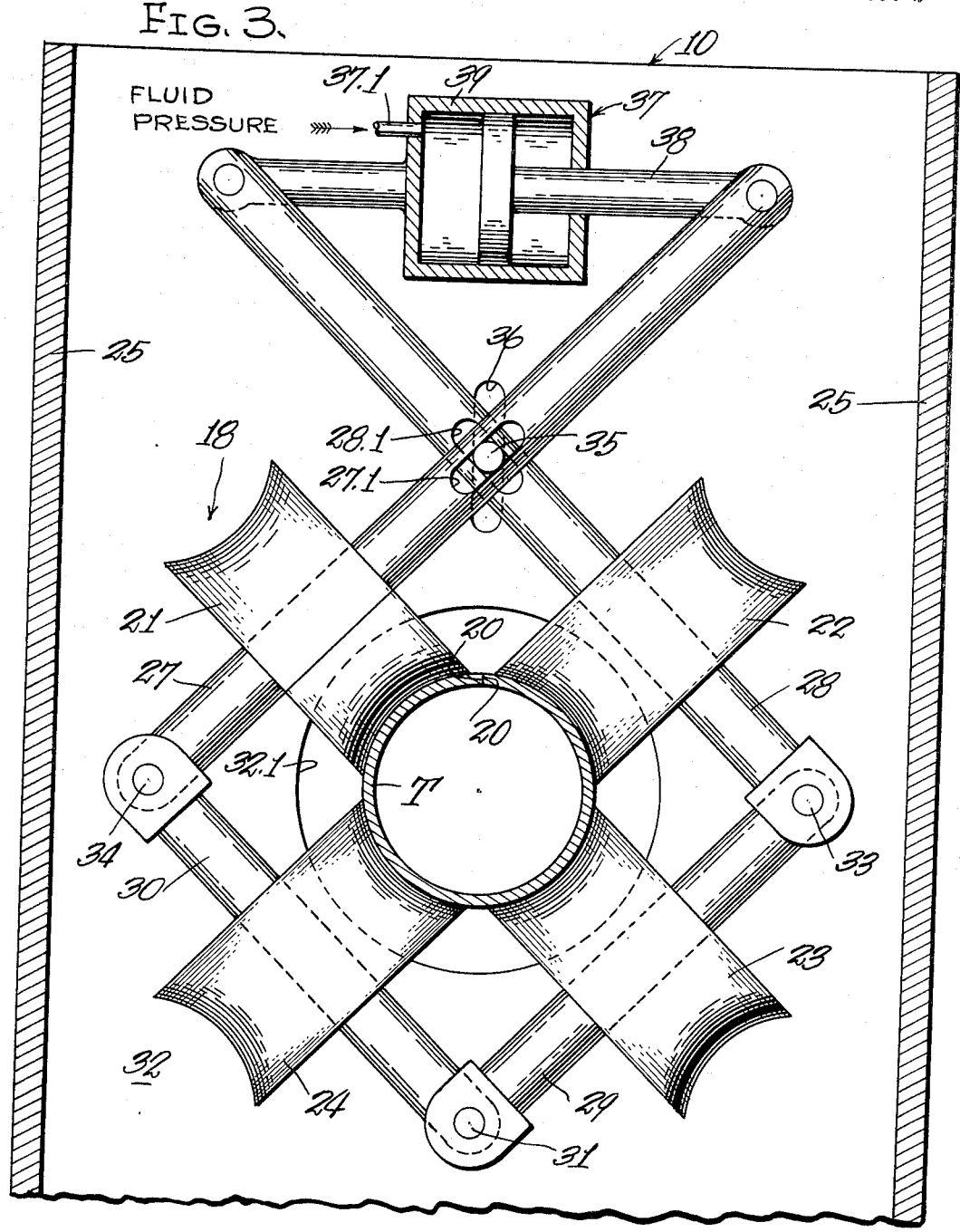

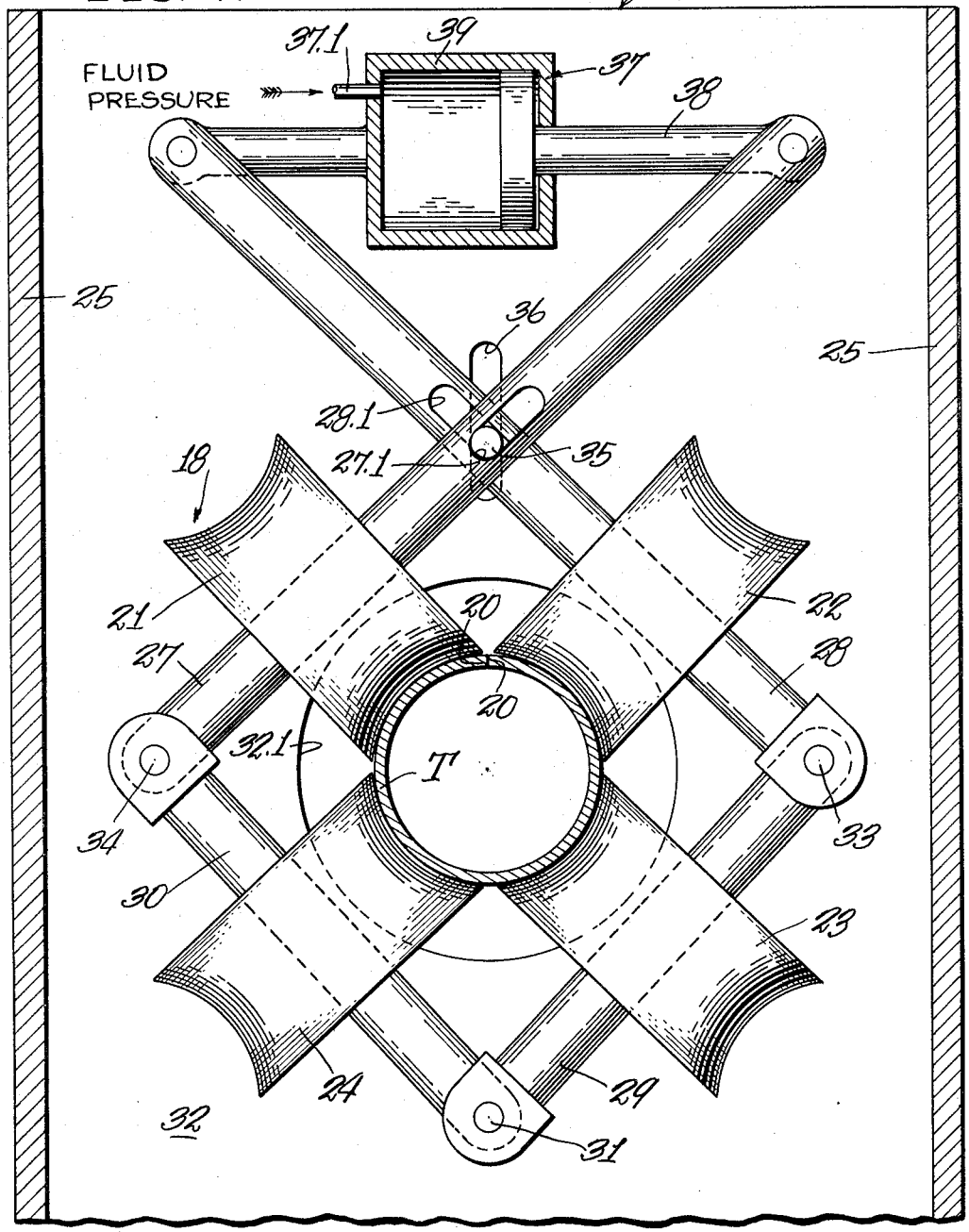

April 5, 1966  C. W. THOMAS  3,244,851
METHODS OF AND APPARATUS FOR MAKING TUBING
Filed Oct. 7, 1963  4 Sheets-Sheet 4
PRIOR ART
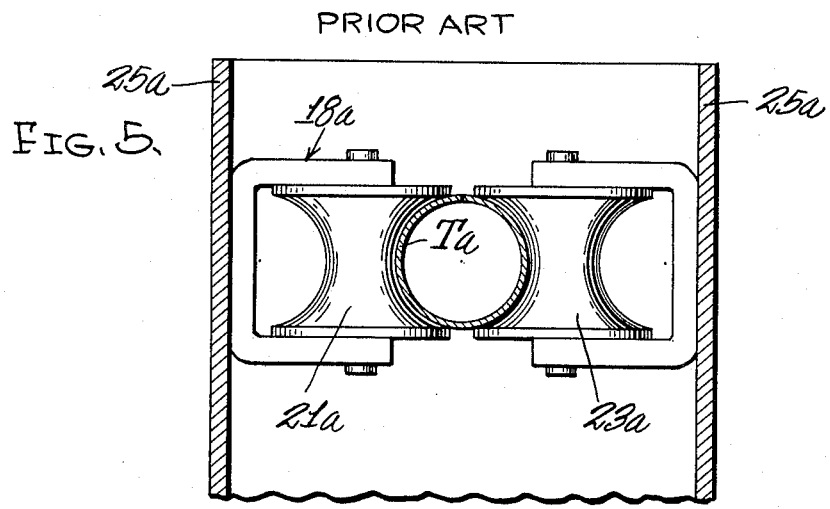
FIG. 5.
PRIOR ART
FIG. 6.
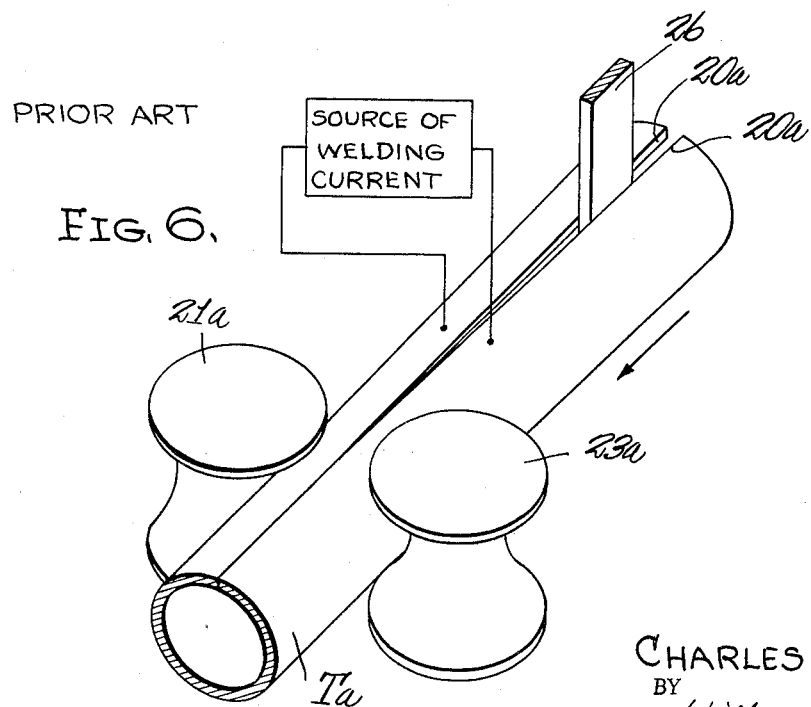
INVENTOR.
CHARLES W. THOMAS
BY Williams and Kreske
ATTORNEYS

United States Patent Office 3,244,851
Patented Apr. 5, 1966

3,244,851
METHODS OF AND APPARATUS FOR MAKING TUBING
Charles W. Thomas, Youngstown, Ohio, assignor to The McKay Machine Company, Youngstown, Ohio
Filed Oct. 7, 1963, Ser. No. 314,276
8 Claims. (Cl. 219—59)

The present invention relates to the manufacture of tubing, more particularly to apparatus for and methods of making metal tubing of the type having a longitudinally extending welded seam, and the principal object of the invention is to provide new and improved methods and apparatus of the character described.

In the manufacture of metal tubing, it has long been common practise to form a metal strip over on itself so that opposed, longitudinally extending margins thereof are in edge-to-edge relation thus providing a longitudinally spit tube. Such margins are then welded together by one of the well-known welding processes to complete the tube. In one of the most commonly used welding processes, the margins aforesaid are heated to fusion temperature by passing welding current therebetween and are pushed together with sufficient force to forge one to the other.

As is well known in the art, electric welding requires a balance between the voltage of the welding current, the amperage of the current and the pressure which urges together the pieces to be welded. Any material deviation in these factors can adversely affect the quality of the weld or that of the welded product. While voltage and amperage of the welding current can be quite easily controlled, it has heretofore been difficult to control the pressure with which the marginal portions defining the split in the tube are forced together. In an attempt to control such pressure, the width of the strip from which the tube is made has been held to very close tolerances; however, while this expedient has been helpful, it has been very expensive since an additional operation is required and considerable material is wasted.

In contrast, the present invention permits tubing to be made from strip having normal width tolerance without affecting the quality of the welded seam of the tube. Thus, strip can be used as it is supplied from the mill without edge-trimming the strip. These and other advantages will readily become apparent from a study of the following description and from the appended drawings.

In the drawings accompanying this specification and forming a part of this application there is shown, for purpose of illustration, an embodiment which the invention may assume, and in these drawings:

FIGURE 1 is a side elevational view of tube forming apparatus which may embody the present invention, FIGURE 2 is an enlarged, perspective view of stock from which tubing is made and illustrating transition of the stock from strip form to tubular form, FIGURE 3 is an enlarged, fragmentary sectional view generally corresponding to the line 3—3 of FIGURE 1, FIGURE 4 is a view similar to FIGURE 3 but showing certain parts in another position, FIGURE 5 is a reduced size view similar to FIGURE 3 but of prior art construction, and FIGURE 6 is a reduced size, generally diagrammatic perspective view of the prior-art apparatus seen in FIGURE 5.

With reference to FIGURE 1, there is more or less diagrammatically shown tube forming apparatus 10 to which strip stock S is fed from a suitable pay-off reel 11 which supports the strip in coil form. Apparatus 10 is provided with a series of roll sets 12 through 19 through which the stock is progressively passed. Since roll sets 12 through 17 may be conventional tube forming roll sets, they have not been shown in detail in the interest of brevity; however, it is to be understood that such roll sets progressively form the strip stock S to tubular form T (see FIGURE 2) by bending the strip over on itself and disposing opposed margins 20 thereof in aligned, edge-to-edge relation. Although not shown, one or more of the roll sets 12–17 may be driven to effect strip movement from the reel 11 through the apparatus 10 in the direction of the arrow. As will later appear and with the strip rolled up as shown to tube form T, the adjoining margins 20 will be welded together to permanently close the split in the tube and complete the latter.

Turning now to FIGURE 3, there is illustrated the roll set 18 with which the present invention is primarily concerned, such roll set functioning to forge the aforesaid tube margins 20 together. Briefly, roll set 18 is herein shown to comprise four rolls 21, 22, 23 and 24 disposed between spaced apparatus side walls 25 and arranged to provide a pass through which the longitudinally split tube passes. Rolls 21, 23 are presently disposed in opposed relation with each other while rolls 22, 24 are similarly disposed. As illustrated, all of these rolls are contoured to generally conform to the tube periphery which, in the present case, is round. It will be clear, however, that if square, oval or other profiled tubes are to be formed, the rolls of roll set 18 will be appropriately contoured.

Before proceeding further with a description of the structure of FIGURE 3, it will be helpful to understand the operation of prior-art apparatus; accordingly, attention is directed to FIGURE 5 wherein parts corresponding to those seen in FIGURE 3 are identified with the same reference characters but with the suffix "a" added. As illustrated, opposed rolls 21a, 23a provide a pass for receiving the longitudinally split tube Ta and although not shown, means are usually provided for adjusting the rolls 21a, 23a toward and away from each other to vary the size of the pass provided thereby. It is to be understood, however, that once adjusted, the rolls form a pass of a fixed size slightly smaller than the transverse size of the tube Ta for a reason to appear.

Turning now to FIGURE 6 wherein the rolls 21a, 23a and the tube Ta are diagrammatically illustrated, means are usually provided to maintain the split in the tube properly orientated and for this purpose, there is usually provided a fixedly positioned blade 26 which fits between the tube margins 20a prior to their being forged together by passage between the rolls 21a, 23a as will appear. Preferably, blade 26 is adjacent to but spaced from the rolls aforesaid in a direction opposite that of tube travel.

Various arrangements are employed to heat the tube margins 20a to fusion temperature; however, as herein disclosed, it will be assumed that welding current is applied to respective tube margins 20a just ahead of the entry of the tube into the pass provided by the rolls 21a, 23a as illustrated in FIGURE 6. Although not shown, such current enters and leaves the tube by means of suitable, tube-contacting shoes or rolls.

Still referring to FIGURE 6 and with the tube Ta moving in the direction indicated, the passage of welding current along the tube margins 20a heats and softens them sufficiently that as the tube passes between the rolls 21a, 23a (such rolls, it being recalled, providing a pass slightly smaller than the transverse size of the tube), the heat-softened tube margins will be forced together in edge-to-edge relation under sufficient pressure to forge them together.

While the above-disclosed, prior-art apparatus functions reasonably well, it does so only when the strip from which the tube is formed is held to a very accurate width. The reason why accurate strip width is so important is due to the fact that the diameter of the tube is directly proportional to the width of the strip from which it is formed and, in a similar manner, the forging pressure exerted on the margins defining the split in the tube is directly proportional to tube diameter. Thus, it will be appreciated that in the event a section of strip is a little narrow, the resulting tube section formed therefrom will be slightly smaller in diameter and therefore the forging pressure exerted by the fixedly sized pass formed by the rolls 21a–23a on the margins defining the tube split will be reduced to a point wherein the resulting weld will be inadequate. On the other hand, a wide section of strip will cause excessive forging pressure to be exerted thus forming a weld with too large an upset, buckling the tube, or displacing the tube margins from alignment with each other.

In contrast, the present invention maintains a constant forging pressure on the tube margins aforesaid despite variations in tube diameter caused by variations in the width of the strip from which the tube is made. Accordingly, strip made to normal commercial tolerances may be used with considerable savings in manufacturing and material costs. The manner in which the present invention provides the advantages aforesaid will now be described with reference FIGURE 3.

Rotatably supporting the rolls 21 through 24 are respective non-rotatable shafts 27 through 30 generally arranged in the form of a square. In the present embodiment, shafts 29 and 30 are pivoted about the axis of a pin 31 which is anchored in a plate 32 extending between the side walls 25, such plate being apertured at 32.1 to pass the tube T. The free end of shaft 29 is pivoted to the adjoining end of shaft 28 by means of a pin 33 while the free end of shaft 30 is pivoted to the adjoining end of shaft 27 by means of a pin 34.

A pin 35 pivotally connects the shafts 27, 28 together, such pin slidably fitting in a vertically disposed slot 36 formed in the plate 32 and in slots 27.1, 28.1 formed in respective shafts 27, 28 and extending longitudinally thereof. Shafts 27, 28 extend beyond the pin 35 and connecting such extended shafts is a fluid cylinder 37 having its piston rod 38 pivoted to the shaft 27 and its cylinder barrel 39 pivoted to the shaft 28.

From the foregoing, it will be understood that if fluid under pressure is admitted to the blank end of cylinder 37 through the pipe 37.1, the shafts 27 through 30 and the rolls respectively carried thereby will be forced toward the axis of the tube T with a force proportional to the fluid pressure admitted to the cylinder.

Assuming that the desired fluid pressure is being applied to the cylinder 37, that the pipe to be welded is traveling through the pass provided by the rolls 21 through 24 and that welding current is being applied to the tube margins 20 just ahead of the roll pass, operation will be as follows: As the welding current passes along the tube margins 20, such margins become heated to fusion temperature. Now, since the rolls 21 through 24 are pressing inwardly on the tube, the tube margins 20 will be forced together to unite them thus closing the split in the tube. In order to maintain the inward pressure on the tube long enough to insure adequate cooling of the tube, pass 19 (FIG. 1) may be provided adjacent roll pass 18 and may be identical thereto. Alternatively, roll pass 19 may be designed to exert sufficient force to function as a sizing pass for the now welded tube.

With reference to FIGURE 4 and in the event a slightly smaller section of tube, caused by its formation from a slightly narrower section of strip, passes through the roll pass 18, the scissors linkage formed by the interconnected shafts 27 through 30 will cause all of the rolls 21 through 24 to move toward the tube axis, under the force exerted by the cylinder 37, to thus maintain a constant forging pressure on the tube margins 20. It will be noted that since the roll shafts are interconnected, all of the rolls will move together thus insuring against a displacement of the tube axis, a twisting of the tube about its axis or a displacement of the tube margins 20 from aligned, edge-to-edge relation as might occur if less than all of the rolls moved together.

In a similar manner and although not illustrated, in the event a slightly larger section of tube passes through the roll pass 18, the rolls 21 through 24 will all move away from the tube axis still maintaining the constant forging pressure on the tube margins 20.

From the foregoing, it will be clear that a constant forging pressure will be exerted on the tube margins 20 even though the strip from which the tube is formed varies in width. Also, it will be evident that if a change is required in forging pressure, a simple increase or decrease in the fluid pressure in cylinder 37 will correspondingly increase or decrease the foregoing pressure.

As previously mentioned, any suitable means may be employed to heat the tube margins 20 prior to their being forged together by passage of the tube through the roll pass 18; accordingly, such margins can be heated, for example, by passing either high or low frequency welding current therethrough, by induction heating, by an electric arc, by flame heating, by passing the tube through a furnace, or by any combination of the foregoing. While the present invention has been described as being applied to roll sets 18 and 19, it will be understood that a similar arrangement may be incorporated in one or more of the roll sets 12 through 17.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. In a seam welding machine for continuously welding the opposed edges of a generally C-shaped metal strip wherein at least portions thereof at said edges are brought to welding temperature, comprising a welding throat through which said strip is passed in pressure contact for forcing the heated edge portions together in welding engagement, said throat comprising a cluster of more than two members supported for movement in a common plane transverse to the line of movement of said strip, each of said members being movable normal to and toward and away from an axis defined by said line of strip movement and said members being adapted to contact the C-shaped strip at equally spaced circumferential places disposed within said plane but out of contact with the seam between said edges, and means mechanically connected to two of said members for moving the same simultaneously the same amount toward and away from said line of strip movement, all of said members being mechanically connected for simultaneous movement in the same amount toward and away from said line of strip movement to provide variation to the size of the throat opening.

2. The construction according to claim 1 and further including means for yieldably opposing movement of said members in a direction away from said line of strip movement.

3. The construction according to claim 2 wherein said means for yieldably opposing movement of said members provides a predetermined pressure on the same in a direction toward said line of strip movement in all operative positions of said members.

4. In a seam welding machine for continuously welding the opposed edges of a generally C-shaped metal strip wherein at least portions thereof at said edges are brought to welding temperature, a welding throat through which said strip is passed in pressure contact for forcing said heated edge portions together in welding engagement;

said throat comprising a cluster of more tran two members supported for movement in a common plane transverse to the line of movement of said strip, each of said members being movable normal to and toward and away from an axis defined by said line of strip movement and said members being adapted to contact the C-shaped strip at spaced circumferential places disposed within said plane, means holding all of said members equidistant from said axis at all times, and fluid pressure means yieldably and equally opposing movement of all of said members in a direction away from said axis, said last named means providing a predetermined pressure on said members in a direction toward said line of strip movement, said pressure being the same in all operative positions of said members.

5. In a seam welding machine for continuously welding the opposed edges of a generally C-shaped metal strip wherein at least portions thereof at said edges are brought to welding temperature, the method comprising passing the strip through a welding throat which surrounds the strip and is comprised of more than two radially movable members, holding said members at all operative times equidistant from and on center with the axis defined by the line of movement of the trip so that said welding throat is at times held on center with the line of movement of said strip and does not deflect the strip from its line of movement despite variations in the transverse size of said strip, pressing the members inward against spaced peripheral portions of the C-shaped strip with a constant pressure regardless of the radial position of the members while restraining said members to equal movement radially inward and outward in accordance with variations in the transverse size of said strip.

6. The method of claim 5 wherein said members are four in number and are pressed against four places of said C-shaped strip which are generally equally spaced about the periphery of the C.

7. Means for exerting a radial inward force on longitudinally moving stock, comprising four rolls engaged with the stock and forming a pass through which the latter travels, each roll being rotatable about a shaft and the four shafts being pivoted together and arranged in a square pattern centered about the axis of the stock, the pivoted juncture of two adjoining shafts being fixed against movement and the pivoted juncture of the two other shafts which is located opposite the first named fixed pivoted juncture being guided for rectilinear movement toward and away from said fixed pivoted juncture, the said two other shafts having portions extending beyond their pivoted juncture, and force applying means connected between such shaft portions for yieldably biasing the rolls toward the axis of the stock with a predetermined amount of force.

8. Tube forming apparatus, comprising a series of longitudinally spaced roll sets for progressively forming a metal strip over on itself so that longitudinally extending opposed margins thereof are in adjoining relation, means for heating said adjoining margins to fusion temperature, four rolls providing a pass through which the longitudinally split tube travels, each roll being rotatable about a non-rotatable shaft, the four shafts being arranged in a generally square pattern centered about the axis of the tube with adjoining shafts pivoted together, the pivoted juncture of two adjoining shafts being fixed against movement and the pivoted juncture of the two other shafts which is located opposite the first named fixed pivoted juncture being guided for rectilinear movement toward and away from said fixed pivoted juncture and also being guided for movement longitudinally of said two other shafts, the latter shafts having portions extending beyond their pivoted juncture, and a fluid cylinder pivotally connected between such shaft portions to exert a predetermined force yieldably biasing the rolls toward the axis of the tube for closing the longitudinal split in the latter by forcing the heated margins together.

References Cited by the Examiner

UNITED STATES PATENTS

| | | | |
|---|---|---|---|
| 1,983,160 | 12/1934 | Adams | 219—8.5 |
| 2,052,380 | 8/1936 | Chapman | 219—59 |
| 2,452,303 | 10/1948 | Honen | 219—59 |
| 2,582,963 | 1/1952 | Cachat | 219—59 |
| 2,669,639 | 2/1954 | Bowman | 219—8.5 |
| 2,762,902 | 9/1956 | Hankin | 219—59 |

RICHARD M. WOOD, *Primary Examiner.*